March 19, 1968      M. LÄSSIG      3,373,617

GYROSCOPIC INSTRUMENT

Filed March 23, 1966      5 Sheets-Sheet 1

Inventor:
Martin Lässig
By: [signature]
Attorney

March 19, 1968　　　　　　　M. LÄSSIG　　　　　　　3,373,617
GYROSCOPIC INSTRUMENT

Filed March 23, 1966　　　　　　　　　　　　　　　　5 Sheets-Sheet 2

Inventor:
Martin Lässig
By: [signature]
Attorney

Inventor.
Martin Lässig
By: B.F. Schlesinger
Attorney

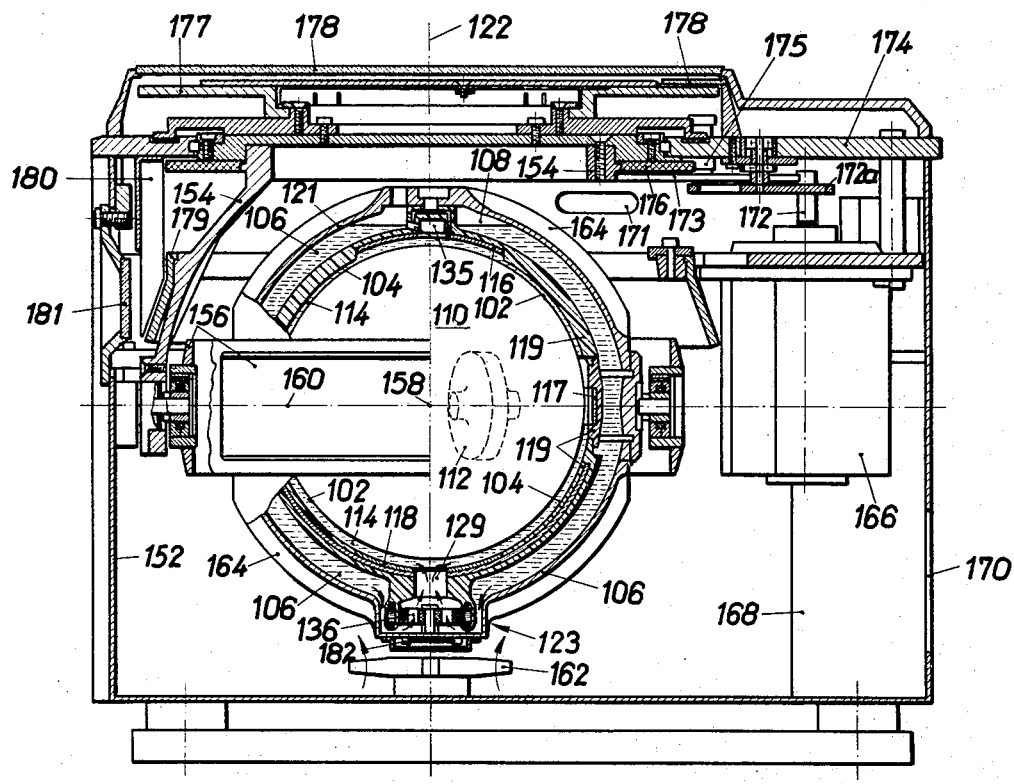

3,373,617
GYROSCOPIC INSTRUMENT
Martin Lässig, Kiel-Hasseldieksdamm, Germany, assignor to Anschutz & Co., G.m.b.H., Kiel-Wik, Germany, a limited-liability company of Germany
Filed Mar. 23, 1966, Ser. No. 536,724
Claims priority, application Germany, Mar. 25, 1965, A 48,742
11 Claims. (Cl. 74—5.46)

My invention relates to a gyroscopic instrument, more particularly to a gyroscopic compass of the type having a hollow sphere enclosing one or more motor-driven gyroscopes, the sphere being immersed in an electrically conductive liquid and being kept freely floating in the vessel containing the liquid. Current is supplied to the motor-driven gyroscopes by current-supplying means which include electrodes, for instance conductive portions of the outer surface of the sphere and of the inner surface of the vessel. These opposed surfaces confine a narrow gap. The inner surface of the vessel containing the liquid may be likewise of spherical shape.

Gryoscopic instruments of this type are well known in the art and are disclosed for instance in U.S. Patent 1,589,039.

In a prior gyroscopic instrument of this type the current-consuming apparatus mounted within the floating sphere include a coil mounted near the bottom of the sphere with its axis extending vertically through the center of the sphere. It is the purpose of this coil to produce a repelling force keeping the sphere in freely floating condition. This force is produced by induction of current in a metal body mounted in the vessel below the sphere. The liquid in the gap is heated by the electrical current passing therethrough and, therefore, must be cooled in order to maintain the temperature of the instrument substantially constant.

It is an object of my invention to facilitate the maintenance of the the temperature of the liquid by improving the cooling effect and by decreasing the current consumption within the sphere and, more particularly, by eliminating the repulsion coil.

It is another object of my invention to so modify a gyroscopic instrument of the type described hereinabove as to permit a substantial reduction of its dimensions.

It is a more specific object of my invention to so modify the gyroscopic instrument of the type described hereinabove as to substantially reduce the width of the gap between the outer surface of the sphere and the inner surfaces of the electrodes provided on the vessel, but avoiding the risk of a consequent stagnation of the liquid in the gap which would entail an undesirable accumulation of heat causing a local rise of temperature. A material reduction of the width of said gap affords the advantageous possibility of reducing the diameter of the sphere. Unless accompanied by a reduction of the width of the gap, a reduction of the diameter of the sphere would unduly reduce the electrical resistance between the different electrode portions of the surface of the sphere. This would increase undesirable cross-currents in the liquid.

Therefore, the general object of my invention is the provision of a gyroscopic instrument of the type set forth hereinabove having greatly reduced dimensions.

Further objects of my invention will appear from a detailed description of various embodiments of my invention with reference to the accompanying drawings. It is to be understood, however, that my invention is in no way restricted or limited to the details of such embodiments but is capable of numerous modifications and of application to other types of gyroscopic instruments within the scope of the appended claims.

In the drawings
FIG. 1 is a vertical section taken through a gyroscopic instrument embodying my invention in which the vessel is provided with a single inlet aperture at its bottom for the liquid circulated through the gap, the vessel being composed of two parts;

FIG. 13 is a vertical section taken through a gyroscopic compass embodying my invention.

Figure 1:
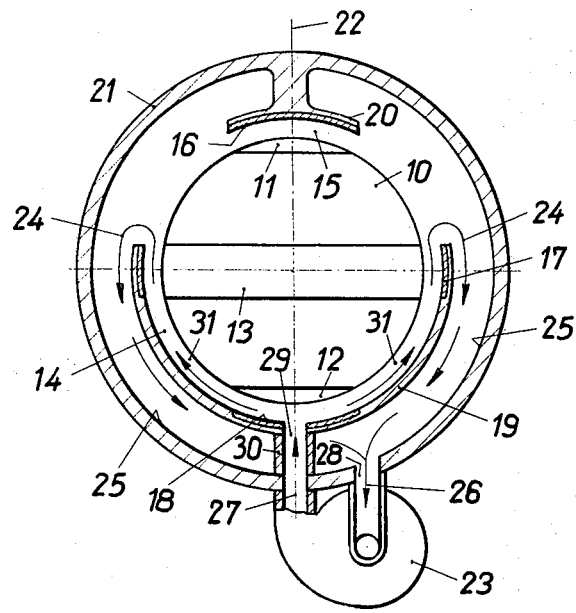

The gyroscopic instrument shown in FIG. 1 is a compass. The north-seeking element thereof is a hollow sphere 10 in which a pair of motor-driven gyroscopes is mounted. This sphere differs from that of the conventional Anschütz gyroscopic compass substantially by its smaller diameter amounting to 115 millimeters for instance and by the absence of the repulsion coil referred to hereinabove. The outer surface of the sphere which is kept in freely floating condition within an electrically conductve liquid is provided with conductive electrode portions 11 and 12 at its poles and with an electrode portion 13 extending along its equator. The conductive liquid may be an aqueous solution of benzoic acid which fills the narrow gaps 14, 15 provided between the electrode surface portions 11, 12 and 13 of the sphere and the inner surface of electrodes 16, 17 and 18 which are provided on a vessel surrounding the sphere at a distance therefrom. In the embodiment illustrated in FIG. 1 the vessel consists of a lower substantially semi-spherical part 19 and of a coaxial upper dish-shaped part 20 spaced therefrom. Both parts 19 and 20 of the vessel are mounted on the inside of and rigidly connected with a container 21 which, in the embodiment shown, is of spherical shape. This container is filled with the electrically conductive liquid and is mounted in a housing (not shown) for universal rotation about its center by suitable means including a rotatable bracket and a gimbal ring. The bracket is mounted in the housing for rotation about the vertical axis and carries the gimbal ring for pivotal movement about a horizontal axis. The gimbal ring in its turn carries the container 21 for pivotal movement about another horizontal axis. A suspension of this type will be described hereinafter with reference to FIG. 13.

The conductive electrode portion 13 of the surface of the sphere extends peripherally but is interrupted in a known manner. The electrical current flowing through the surface portion 13 and through the opposed electrode surfaces 17 controls a follow-up motor in a known manner. This motor is geared to the bracket referred to hereinbefore and causes the container 21 carried thereby and the vessel 19, 20 fixed to the container to follow the sphere 10 in its rotation about the vertical axis 22. The electrical current supplied through the opposed pairs of electrode surfaces, however, does not only serve to control the follow-up motor but also drives the gyroscopes mounted within the sphere.

As the phases of the electrical currents passing through the opposed pairs of electrode surfaces are shifted relatively to each other, cross-currents will flow between the electrode surface 17 and the electrode surfaces 16 and 18. As this cross-flow of current does not serve any useful purpose but rather contributes to the heating effect of the current on the liquid, it is desirable, to reduce such cross-currents to a minimum. The importance of this object of my invention is enhanced by the fact that the distance of the electrode surface 17 from the surfaces 16 and 18 is very short owing to the smaller diameter of the sphere 10.

In order to reduce the undesirable cross-currents, it is desirable to decrease the width of the gap 14, 15 to a minimum. This decrease, however, was not feasible in the prior Anschütz compass because the freely floating sphere is liable to contact the surrounding electrode surfaces in response to high accelerations, unless the width of the gap exceeds a certain limit. Moreover, a reduction of this width may result in a stagnation of the liquid entailing local heat accumulation and excessive temperatures. This risk is avoided where the gap is comparatively wide and, therefore, permits temperature differences to produce a circulation in the liquid resulting in heat convection from the sphere to the surrounding vessel. A local overheating of the liquid, however, interferes with an accurate measuring of the average temperature of the liquid and, therefore, interferes with an accurate maintenance of the temperature on a fixed degree. In the absence of such an accurate temperature control the buoyancy of the sphere changes making it difficult or impossible to keep the sphere freely floating. Moreover, a local overheating results in a fluctuation of the conductivity of the liquid. Also, experience has shown that air bubbles may form within the liquid. Where the gap 14, 15 is very narrow, air bubbles therein may stick to the surface of the sphere 10 owing to a stagnation of the liquid and may exert interfering forces upon the sphere.

Unless the width of the gap 14, 15 be considerably reduced compared with the width of the gap in the conventional Anschütz compass, it is impossible to considerably reudce the diameter of the sphere. The reason has been explained hereinabove. As the conductive liquid carries undesirable cross-currents between the different pairs of electrodes, the distance of the electrodes 17 from the electrodes 18 and 16 must be a predetermined multiple of the width of the gap 14, 15. Unless this width is reduced is it possible to reduce the diameter of the sphere.

The sphere 10 is heated in operation owing to the electrical energy supplied thereto and this heat must be dissipated through the conductive liquid. This heat dissipation is rendered more difficult by the fact that the liquid itself is additionally heated by the electric current flowing therethrough.

In the conventional Anschütz compass the gap between the floating sphere and the surrounding vessel had such a width that the flow of liquid produced by the difference of temperatures in the gap was sufficient to convey the heat from the surface of the sphere 10 to the surrounding spherical vessel and this vessel was cooled in its turn from the outside by cooling water or by a stream of cooling air. It is desirable, however, to make the gap as narrow as possible in order to reduce the electrical resistance between the opposed electrode surfaces, for instance between the surfaces 17 and 13 or between the surfaces 11 and 16 or between the surfaces 12 and 18 and in order to increase the resistance between the electrode surfaces 16, 17 and 18. Where this last-mentioned resistance is too low, for instance owing to a reduction of the diameter of the sphere, the above-explained cross-currents between the electrodes 16, 17 and 18 will become excessive and will unduly heat the liquid. Where it is desirable to reduce the diameter of the sphere 10, ways and means must be found enabling the gap 14, 15 to be made more narrow. This, however, was not possible heretofore because (1) with a narrow gap the stagnation of the liquid therein prevents the heat from being conveyed by the flow of liquid from the sphere to the surrounding vessel and (2) bubbles forming in the liquid tended to stick in the narrow gap and to exert interfering forces on the sphere.

By modifying the conventional Anschütz compass in the manner described hereinafter it has been possible to overcome these difficulties and to reduce the width of the gap between the outer surface thereof and the inner surface of the surrounding vessel quite considerably. A circuit has been provided for the flow of liquid heated by the electric current, such circuit including a pump 23 which is preferably mounted directly on the vessel 21. The conductive liquid flows in this circuit after leaving the gap 14 in the direction of the arrows 24 across a cooled surface 25 formed by the inner surface of the vessel 21 and then returns again in the direction of the arrows 26 and 27 through the pump 23 into the gap 14. For this purpose, the vessel 16, 17 has been provided with an inlet and an outlet. Moreover, guide means have been provided on the vessel 16, 17 outside of the gap 14, 15, such guide means constituting a passageway leading from the outlet to the inlet. In the embodiment illustrated in FIG. 1 the inlet is formed by an aperture 29 of the vessel at the bottom thereof whereas the outlet is formed by the space provided between the upper edge of vessel part 17 and the edge of the dish-shaped vessel part 16. The guide means on the vessel outside of the gap 14 and 15 is formed by the container 21. The inner surface 25 of the container and the outer surface of the vessel part 19 confine between them the passageway leading from the outlet to the inlet 29. In this passageway the motor-driven pump 23 is included for circulating the liquid through the gap 14 and through the passageway. The pump is of the rotary impeller type. Its intake communicates with an aperture 26 provided in the bottom of the container 21 whereas the pressure pipe of the pump communicates with the inlet aperture 29 provided at the bottom of the vessel part 19. For this purpose the part 19 of the vessel is supported at its bottom by a tube 30 which surrounds the axis 22, the ends of the tube being rigidly connected with the internal wall 25 of the container 21 and with the vessel part 19. The flow of liquid entering the gap 14 through the inlet aperture 29 will flow in all directions as indicated by the arrows 31 thus forming a liquid bearing which will keep the sphere 10 in freely floating condition centered in the spherical vessel 19, 20. Preferably, the sphere has a small overweight which is carried by the flow of the liquid. This is the reason, why the conventional repulsion coil in the sphere can be omitted.

The container 21 is preferably so designed that it will effectively dissipate the heat even with a low drop in temperature. For this purpose the container is preferably made of a metal of high heat conductivity and is provided with cooling ribs on its outer surface and, if desired, on its inner surface. A suitable fan not shown in FIG. 1 is provided to blow a cooling air-stream upon the outer surface of the container 21. As the flow of liquid removes any air or gas bubbles from the gap 14 which may form within the liquid, its width may be very small, for instance 2 millimeters. As a result, the electrical resistance between each electrode surface of the sphere and the opposed electrode surface provided on the vessel is very low and this reduces the amount of electrical energy converted into heat in the liquid considerably. On the other hand, the electrical resistance between the electrode surface 17 and the electrode surfaces 16 and 18 become very high. Therefore, the diameter of the sphere 10 may be considerably reduced compared with the conventional Anschütz compass without risking the generation of excessive crosscurrents flowing through the liquid between the electrode 17 and the electrodes 16 and 18.

The differences of temperature within the conductive liquid would be much higher without the compulsory circulation of the conductive liquid. Higher temperature differences, however, would interfere with a measuring of the average temperature of the liquid and, therefore, would make it impossible to maintain this temperature constant. Owing to the compulsory circulation the quantity of the liquid may be reduced and this results in a saving of weight and space. Without the compulsory circulation of the liquid a reduction of its quantity would render the measuring and the regulation of the temperature even more difficult. An exact regulation to keep the temperature constant is necessary however for the purpose of maintaining the conductivity of the liquid and the upthrust exerted by the liquid on the floating sphere substantially constant.

Figure 2:
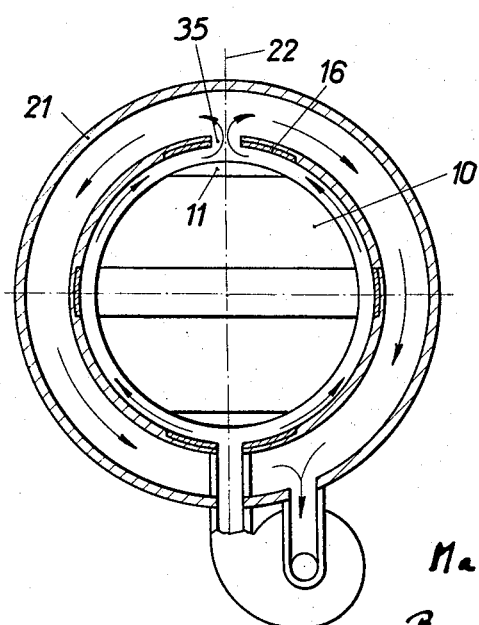
FIG. 2 is a vertical section taken through a gyroscopic instrument representing another embodiment of my invention in which the vessel consists of a single part having an outlet aperture at its top for the liquid circulated through the gap by a pump.

The embodiment of my invention illustrated in FIG. 2 differs from that of FIG. 1 by the integral structure of the vessel surrounding the floating sphere 10 and by the provision of an aperture 35 at the top of the vessel 16 constituting the outlet thereof, such aperture being coaxially disposed with respect to the vertical axis 22 of the instrument. This offers the advantage that the inner surface of the upper part of the container 21 too is in contact with the circuit of the liquid and therefore contributes particularly effectively to the cooling thereof. Moreover, the circulating liquid will carry away any air bubbles from the gap between the electrode surfaces 11 and 16, in contrast to the embodiment shown in FIG. 1.

Figure 3:
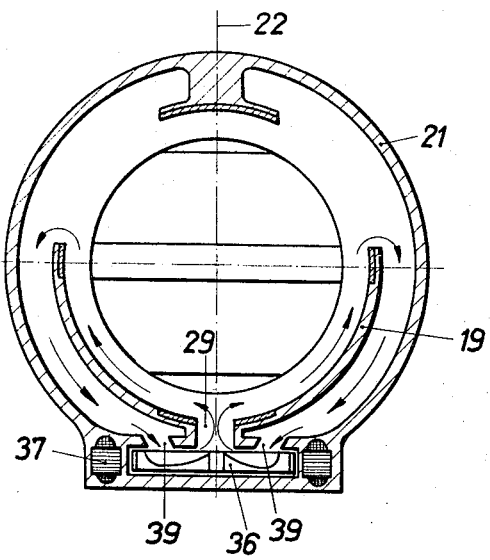
FIG. 3 is a vertical section through a gyroscopic instrument representing a third embodiment of my invention in which the pump for circulating the liquid through the gap has been modified compared with FIGS. 1 and 2.

The embodiment of my invention illustrated in FIG. 3 differs from that of FIG. 1 by the disposition and structure of the pump directly mounted on the container 21. The rotary impeller 36 of this pump is formed by a squirrel-cage armature of an A.C. motor, the stator 37 of such motor being mounted on the container 21. The rotor 36 and the stator 37 are coaxially disposed with respect to the single inlet aperture 29 of the vessel part 19 and of the vertical axis 22 of the container, the pump being designed as a centripetal pump, the liquid flowing along the impeller vanes in inward direction. The intake of the pump is formed by an annular opening 39 which surrounds the axially disposed pressure duct of the pump and directly communicates with the passage between the vessel part 19 and the wall of the container 21. In this manner a particularly compact structure is attained in which the path of flow within the pump is extremely short. As a result, the circulating liquid meets with but little frictional resistance.

Figure 4:
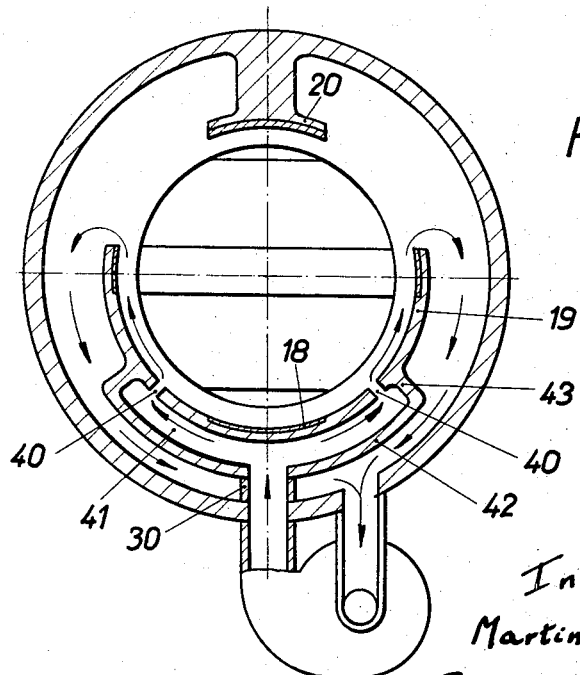
FIG. 4 is a vertical section taken through a gyroscopic instrument representing a fourth embodiment of my invention in which the inlet for the liquid circulated through the gap is formed by a plurality of apertures.

The embodiment of the invention illustrated in FIG. 4 differs from that shown in FIG. 1 by the provision of the vessel part 19 with a plurality of inlet apertures 40 in lieu of a single axially disposed inlet aperture 29 in FIG. 3, the apertures 40 being uniformly distributed along a circle concentrically surrounding the central vertical axis of the instrument. The liquid is guided from the upper end of the tube 30 to the inlet apertures 40 by a passageway 41 confined between the vessel part 19 and a dish-shaped wall 42 attached to the bottom of the vessel part 19 in spaced relationship thereto. The tube 30 terminates at this wall 42 and is fixed thereto. The edge of the wall 42 is connected with the vessel part 19 by a flange 43. The axes of the apertures 40 are inclined to the vertical axis of the instrument by about 45°. This embodiment has the advantage that the bottom electrode 18 has a larger surface as it is not interrupted by the inlet opening 29 of FIG. 1. Another advantage resides in that the flow of the liquid will more effectively center the sphere 10 within the surrounding vessel 19, 20.

Figure 5:
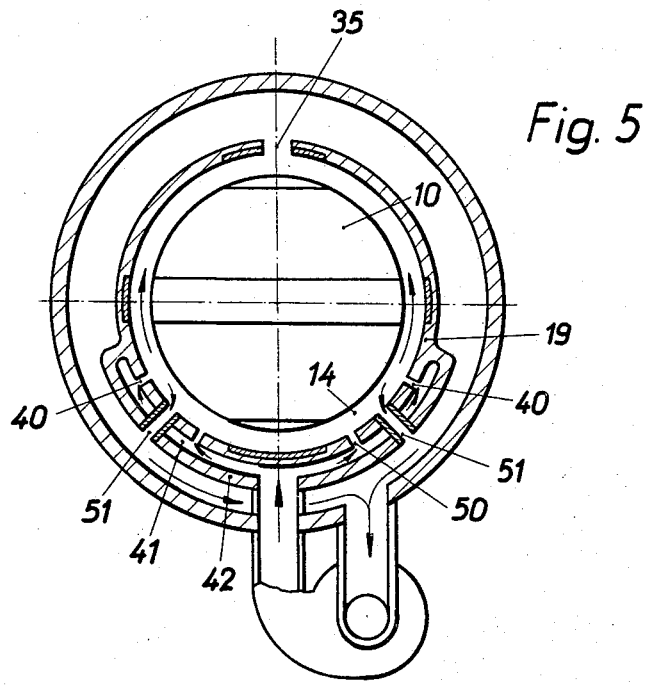
FIG. 5 represents an embodiment of my invention in a view similar to that of the preceding figures in which the outlet of the liquid from the gap is formed by a plurality of apertures of the vessel.
Figure 6:
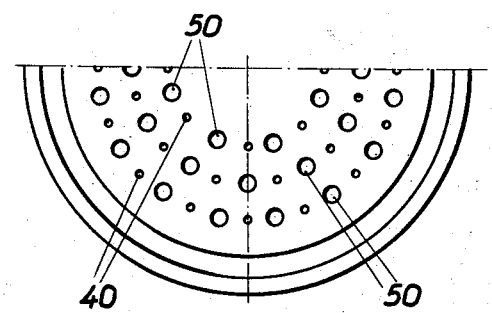
FIG. 6 is a radial projection on a plane of the inner surface of the lower section of the vessel shown in FIG. 5.

The embodiment of my invention illustrated in FIGS. 5 and 6 differs from that shown in FIG. 4 by the provision of a one-piece vessel as in FIG. 2, having an outlet aperture 35 at its top and having, in addition to the series of inlet apertures 40 an additional series of inlet apertures 50 evenly distributed on a circle disposed inside of that of the apertures 40 and finally having, between these two circles, a third series of apertures 51 likewise evenly distributed along a circle. The apertures 51 form a second outlet for the circulating liquid. The liquid leaving the gap between the sphere and the surrounding vessel through the outlet apertures 51 flows through tubes each of which extends thorugh the space 41, one end portion of each tube being inserted in an aperture of the wall 42 and the other end section being inserted in the aperture 51 of the vessel 19. The stream of liquid entering the gap 14 through the inlet apertures 40 is split up into two streams, one stream flowing upwardly to the outlet aperture 35 and the other stream flowing downwardly to the outlet apertures 51 which moreover receive the streams of liquid entering the gap 14 through the inlet apertures 50.

The subdivision of the stream of liquid and the distribution thereof over a large number of uniformly distributed apertures 40 and 50 offers the advantage that there is a high statistical probability that any departures of the direction of flow in the vicinity of the individual inlet apertures will balance each other and, therefore, will not exert any undesirable torque on the sphere 10 by friction.

Experience has shown that the circulation of the liquid through the gap 14 will effectively center the sphere 10 within the vessel 19 even with a very low velocity of the flow and that the circulation of the liquid will not produce any appreciable torque upon the sphere about the vertical axis 22.

Figure 7:
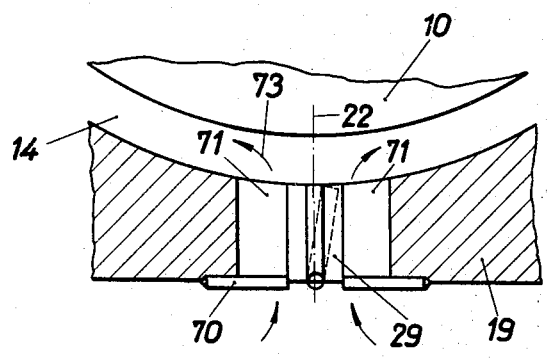
FIG. 7 represents a central part of FIG. 3 shown on an enlarged scale and representing adjustable guiding means inserted in the inlet of the vessel.
Figure 8:
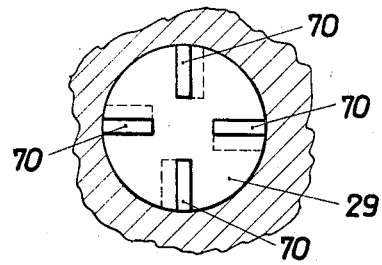
FIG. 8 is a plan view of the guiding means shown in FIG. 7.

Should it be found in any particular instance, however, that the circulating flow in the gap 14 between the vessel 19 and the sphere 10 does exert an undersirable torque upon the sphere, as an exception from the rule, suitable means may be provided for controlling the direction of flow through the inlet apertures 29 or the inlet apertures 40 and/or 50. Such means is illustrated in FIG. 7 showing the bottom of the vessel 19 provided with the inlet aperture 29. Radially extending horizontal pins 70 are attached to the bottom face of the vessel 19 so as to extend radially towards the axis 22 across the edge of the inlet aperture. The lower ends of vanes 71 extending upwardly into the aperture 29 are fixed to the projecting portions of the pins 70. These vanes may be so disposed as to extend parallel to the axis 22. If so, they will suppress any tendency of the flow to form a swirl about the axis 22. If desired, however, the vanes may be so deformed as to extend obliquely, for instance in the manner indicated in FIGS. 7 and 8 by dotted lines. With this disposition of the vanes a rotary component will be imparted to the flow entering the gap 14 so as to counteract any rotary component the flow may have prior to engagement with the vanes. Hence, it will appear that the vanes may be so adjusted as to cause the liquid to enter the gap 14 in the exact radial direction indicated by the arrows 73. This is desirable in order to prevent the flow of the circulating liquid from exerting any frictional torque upon the sphere 10 about the axis 22, as such torque would introduce an error into the indication of the compass.

Figure 11:
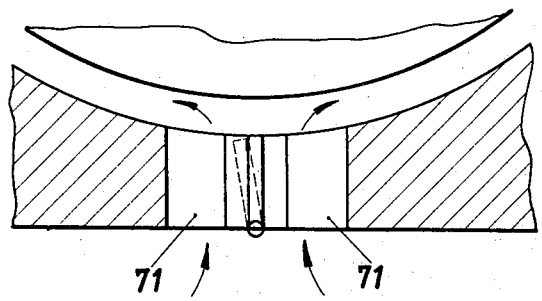
FIG. 11 is a view similar to that of FIG. 7 of adjustable guiding means inserted in the inlet aperture of the vessel.
Figure 12:
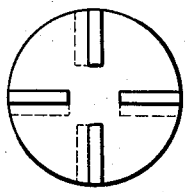
FIG. 12 is a plan view of the adjustable means shown in FIG. 11.

The adjustable means, however, may be so designed as to cause the flow of liquid to pass through the aperture 29 into the gap 14 in a direction which departs from the axis 22 laterally. This is illustrated in FIGS. 11 and 12 in which opposite vanes 71 are so adjusted as to extend obliquely parallel to each other. As a result they will divert the flow entering the gap 14 in a direction towards the left and towards the bottom of FIG. 12 without producing any rotary component of the flow about the axis 22. Such an adjustment may be desirable in order to compensate any tendency of the sphere to assume a laterally offset position in the surrounding vessel.

Figure 9:
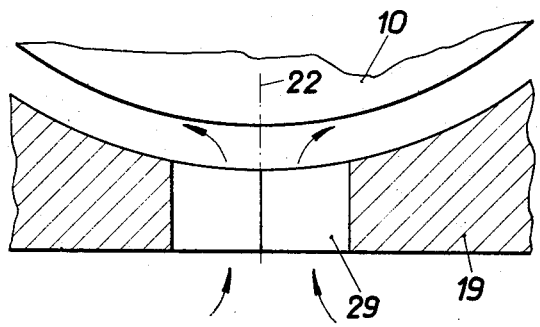
FIG. 9 is a view similar to that of FIG. 7 of modified guiding means inserted in the inlet aperture of the vessel.
Figure 10:
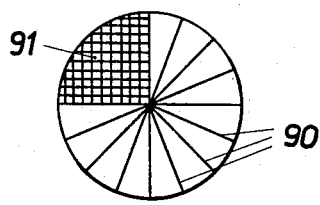
FIG. 10 is a plan view of the guiding means illustrated in FIG. 9.

In FIGS. 9 and 10 another kind of flow-directing means is shown as being mounted in the intake opening 29 of the vessel 19. This flow-directing means has a grid-like structure. It may be composed of radial vanes 90 extending parallel to the axis 22 or of two sets of parallel equidistant plane sheet metal vanes 91, the vanes of one set intersecting those of the other set at right angles. Each of the vanes 90, 91 extends parallel to the axis 22 and, therefore, will tend to suppress any rotary component of the flow entering the gap 14 through the inlet aperture 29.

If desired, the inlet apertures 40 and 50 may be likewise equipped with flow-directing means such as described hereinabove with reference to FIGS. 7–12.

Moreover, the flow-directing means mounted within the inlet aperture or apertures may be formed by plugs consisting of a porous material. This has the effect that the direction of the flow leaving the pores of the plug and entering the gap 14 is not clearly defined and, therefore, has no preferred direction and no rotary component such as would exert undesirable torques upon the sphere.

Moreover, the "sphere" 10 need not be exactly spherical, since the invention is equally applicable to gyroscopic instruments in which the floating support of the gyroscopes has a shape other than an exact sphere.

Moreover, the weight of the sphere may be made so low that the upthrust exerted by the liquid overcomes the weight. In this event the inlet apertures of the surrounding vessel are provided in the top portion thereof whereas the outlet apertures are provided at a lower level. Such a disposition of the apertures is illustrated by FIGS. 4 and 5, if these figures are placed upside down so that the inlet apertures 40 are located above the equator plane of the sphere.

In FIG. 13 a gyroscopic compass is shown in which a sphere-surrounding vessel of the type illustrated in FIG. 2 is combined with an impeller pump of the type shown in FIG. 3. This gyroscopic compass comprises the hollow sphere 110, motor-driven gyroscopes such as 112 mounted within the sphere so as to impart north-seeking properties thereto, the spherical vessel 119 surrounding the sphere 110 and being provided with an inlet 129 at its bottom and with an outlet 135 at its top, a gap 114 being provided between the outer surface 102 of the sphere 110 and the inner surface 104 of the vessel 119, a container 121 surrounding and rigidly connected with the vessel 119 at spaced relationship thereto, the space 106 therebetween constituting a passageway leading from the outlet 135 to the inlet 129, a liquid having a level 103 substantially filling the container 121 and the vessel 119, a motor-driven pump 123 mounted in the container 121 at the bottom thereof below the inlet 129 for circulating the liquid through the inlet 129, the gap 104, the outlet 135 and the passageway 106, current-supplying means including conductive electrode portions 116, 117 and 118 of the surface 104 and opposed electrode portions (not shown) on the sphere 110 for supplying electrical energy to the gyroscopes 112 through the liquid in the gap 114, a housing 152, a rotary bracket 154 mounted in the housing 152 for rotation about a vertical axis 122, means including a gimbal ring 156 for suspending the container 121 by the bracket 154 within the housing 152 for universal movement about the center 158 of the vessel 119 in which the vertical axis 122 intersects the two principal horizontal axes 160 of the gimbal ring 156, a motor-driven fan 162 in the housing 152 for cooling the outside of the container 121 provided with outer cooling ribs 164, a follow-up motor 166 geared to the bracket 154 and electrical means diagrammatically indicated at 168 which are controlled by the current-supplying means and control the follow-up motor 166 so as to cause the container 121 and the vessel 119 to follow angular movements of the sphere 110 about its vertical axis 122. The electrical means 168 are well known in the art being disclosed by the afore-mentioned U.S. patent to Anschütz-Kaempfe and, therefore, need not be described in detail.

The housing 152 has an air inlet opening 170 and air outlet slots 171. The rotary impeller 136 of the pump is formed by the rotary armature of the squirrel-cage type of an A.C. motor the stator of which is inserted in an internal pocket provided in the bottom of the container 121. This stator is provided with radial slots constituting passageways for the liquid leading from the passageway 106 to the bottom of the impeller 136 and from the top of the impeller to the inlet 129.

The transmission between the follow-up motor 166 and the rotary bracket 154 comprises a stub shaft 172 flexibly mounted on the rotor of the follow-up motor 166 and frictionally engaging the periphery of a friction wheel 172a rotatably mounted on a shaft journaled in bearings connected to a horizontal plate 174 of the housing 170. A smaller friction wheel fixed to this shaft frictionally engages the periphery of a wheel 173 mounted on the horizontal plate 174 of the housing 152, a friction wheel 175 of smaller diameter integrally connected with the wheel 173 and a peripheral flange 176 fixed to the bracket 154 and frictionally engaged by the friction wheel 175. The bracket 154 carries the compass dial 177 disposed below a transparent window pane 178 carried by the housing 170. The lubber line is provided on a member 178 fixed to the housing 170. A second dial is provided on a conical skirt 179 fixed to the bracket 154 and cooperating with a lubber line indicator 180 fixed to the housing and visible through a window 181 in the side-wall of the housing 170. At the bottom of the inner pocket accommodating the pump 123 there is provided a bimetal thermostat 182 which controls the motor driving the fan 162 so as to keep the temperature in the surroundings of the thermostat constant.

The vessel 119 is composed of a lower cap, of an upper cap and of a cylindrical annular member therebetween which is provided with the electrode surface portion 117. Each of these elements may be formed by a suitable plastic. The lower cap may be formed with a metal core as illustrated in FIG. 13. The internal radius of the upper cap forming the top of the vessel 119 may be smaller than the radius of the lower cap. As a result the gap 114 is wider at the bottom than at its top amounting for instance to 3.5 millimeters at the bottom.

The advantages of the invention as here outlined are best realized when all of its features and instrumentalities are combined in one and the same structure, but useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

What I claim is:

1. In a gyroscopic instrument, the combination comprising a hollow sphere, at least one motor-driven gyroscope mounted within said sphere, a vessel having an inlet and an outlet and surrounding said sphere at a distance therefrom providing for a gap between the outer surface of said sphere and the inner surface of said vessel, a liquid filling said vessel, guide means on said vessel outside of said gap constituting a passageway leading from said outlet to said inlet, a motor-driven pump included in said passageway for circulating the liquid through said gap and through said passageway, current-supplying means including conductive electrode portions of said surfaces for supplying electrical energy to said gyroscope through the liquid in said gap, said inlet being so located that the stream of liquid entering said gap therethrough is operative to keep said sphere floating within said vessel, and cooling means for cooling said passageway.

2. The combination claimed in claim 1 in which said inner surface of said vessel is spherical.

3. The combination claimed in claim 1 in which said inlet is located below said sphere.

4. The combination claimed in claim 1 further comprising adjustable flow-directing means mounted on said vessel within said inlet.

5. The combination claimed in claim 4 in which said inlet is formed by an aperture located below the center of said sphere, said flow-directing means being so shaped as to impart a swirling motion to the stream of liquid entering said gap through said aperture.

6. The combination claimed in claim 1 in which said inlet is formed by an aperture located below the center of said sphere, grid-like flow guiding means being provided within said aperture for guiding the flow therethrough in vertical direction.

7. The combination claimed in claim 1 in which said inlet is formed by an aperture located below the center of said sphere, said pump being of the rotary impeller type disposed below said aperture.

8. The combination claimed in claim 1 in which said inlet is formed by an aperture coaxially disposed with respect to a vertical axis extending through the center of said sphere, said combination further comprising an electric motor having a stator mounted on said guide means below said aperture in coaxial relationship thereto and having a rotary armature forming the rotary impeller of said pump being provided with impeller vanes, said stator being provided with ducts for conducting said liquid from said passageway to said impeller and from said impeller to said intake aperture.

9. The combination claimed in claim 8 in which said electric motor is an A.C. motor, said armature being of the squirrel-cage type.

10. A gyroscopic compass comprising a hollow sphere, motor-driven gyroscopes mounted within said sphere so as to impart north-seeking properties thereto, a spherical vessel surrounding said sphere and provided with an inlet at its bottom and an outlet at its top, a gap being provided between the outer surface of said sphere and the inner surface of said vessel, a container surrounding and rigidly connected with said vessel at spaced relationship thereto, the space therebetween constituting a passageway leading from said outlet to said inlet, a liquid substantially filling said container and said vessel, a motor-driven pump mounted in said container at the bottom thereof below said inlet for circulating said liquid through said inlet, said gap, said outlet and said passageway, current-supplying means including conductive electrode portions of said surfaces for supplying electrical energy to said gyroscopes through the liquid in said gap, a housing, a rotary bracket mounted in said housing for rotation about a vertical axis thereof, means including a gimbal ring for suspending said container by said bracket within said housing for universal movement, a motor-driven fan in said housing for cooling the outside of said container, a follow-up motor mounted in said housing and geared to said bracket, and electrical means controlled by said current-supplying means and controlling said followup motor so as to cause said container and said vessel to follow angular movements of said sphere about its vertical axis.

11. A compass as claimed in claim 10 in which said housing has at least one air inlet opening.

References Cited

UNITED STATES PATENTS 1,589,039   6/1926   Anschütz-Kaempfe ___ 74—5.46

FRED C. MATTERN, Jr., *Primary Examiner.*

F. D. SHOEMAKER, *Assistant Examiner.*